July 17, 1962
W. E. WOOLLENWEBER, JR
3,044,683
PRESSURE CONTROL FOR TURBOCHARGERS
Filed Jan. 18, 1960
2 Sheets-Sheet 1
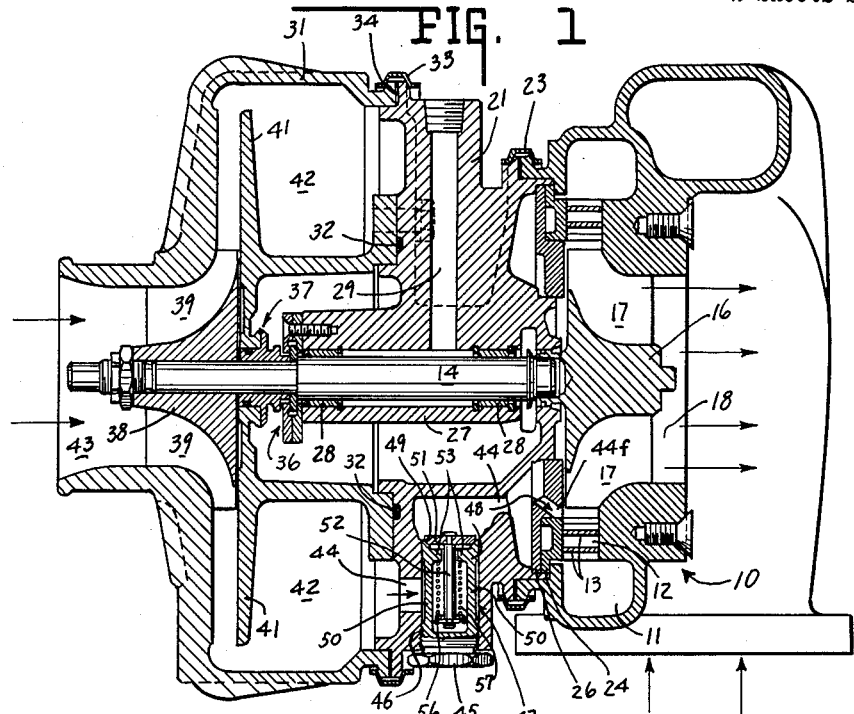
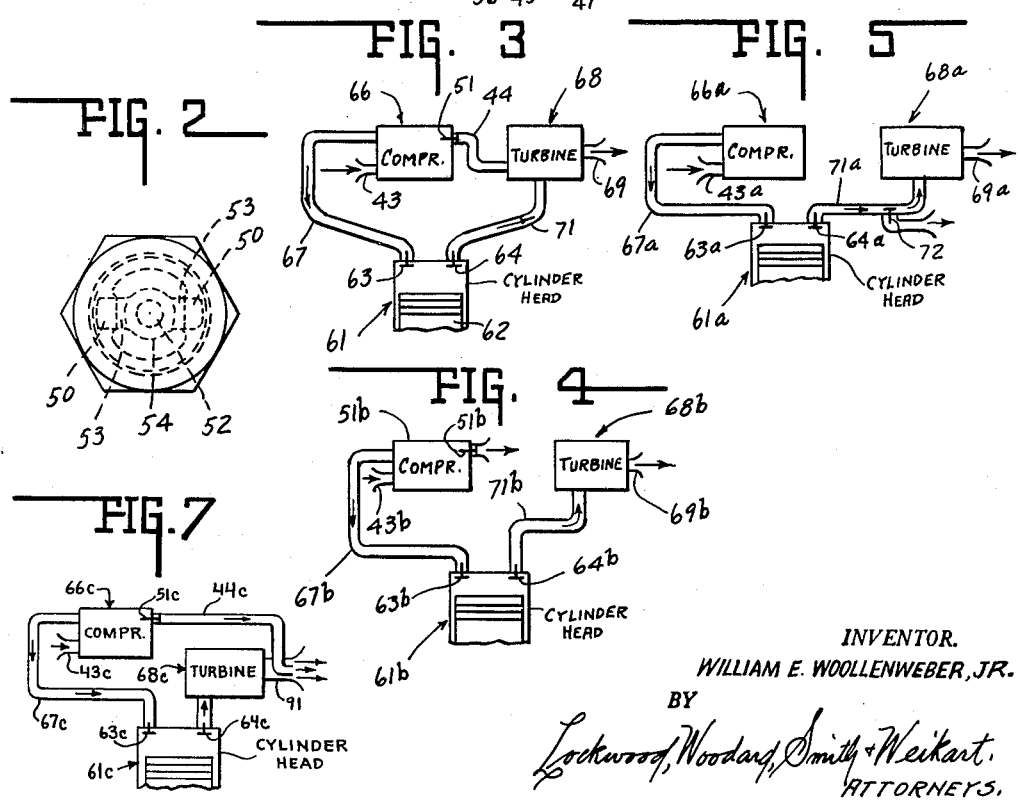
INVENTOR.
WILLIAM E. WOOLLENWEBER, JR.
BY
Lockwood, Woodard, Smith & Weikart.
ATTORNEYS.

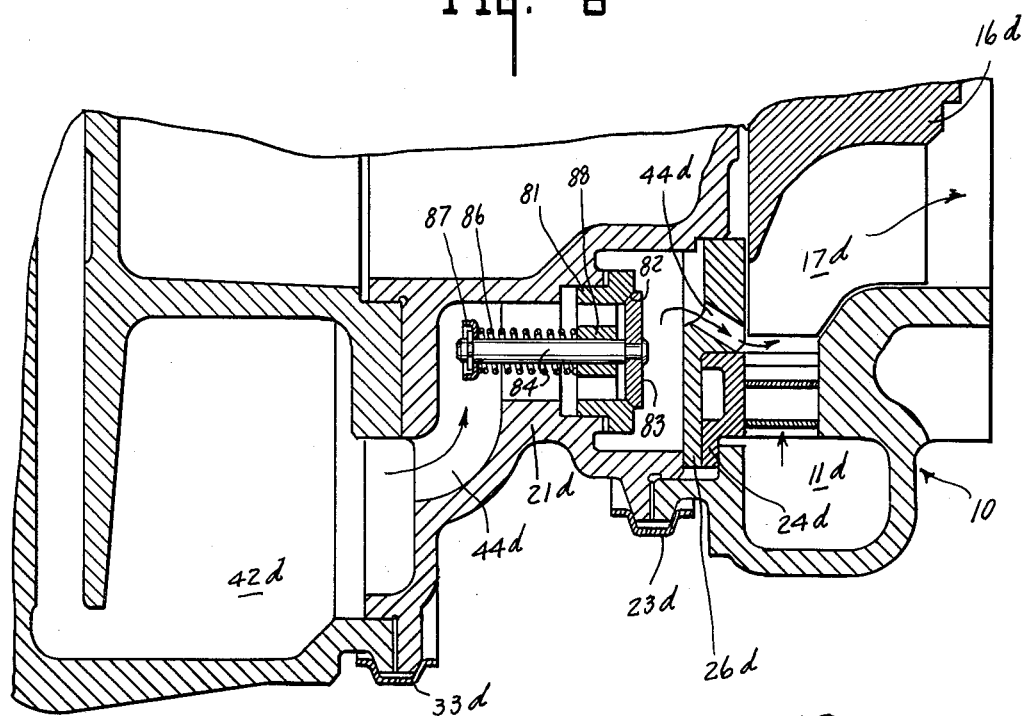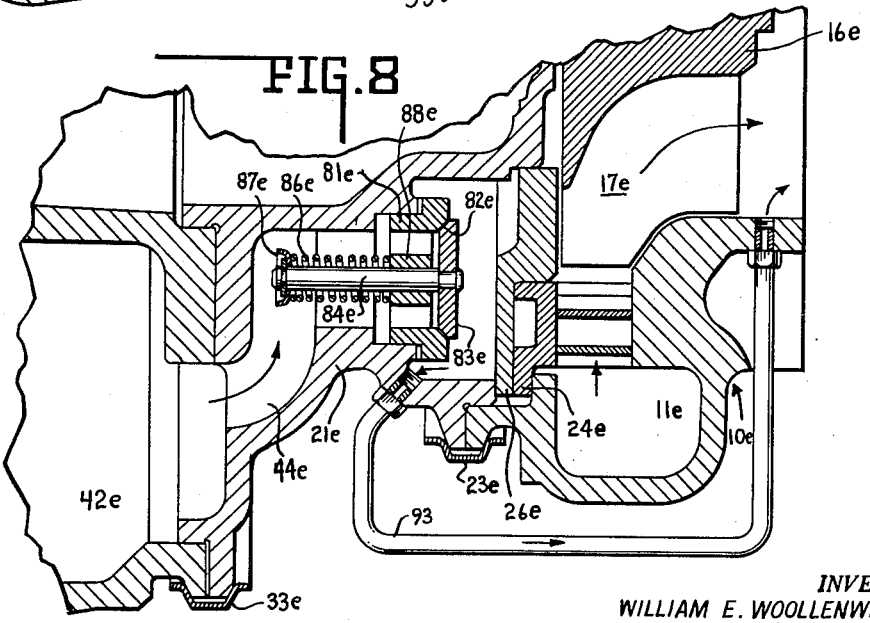

3,044,683
PRESSURE CONTROL FOR TURBOCHARGERS

William E. Woollenweber, Jr., Columbus, Ind., assignor to Schwitzer Corporation, Indianapolis, Ind., a corporation
Filed Jan. 18, 1960, Ser. No. 3,040
1 Claim. (Cl. 230—116)

This invention relates generally to turbochargers for use with internal combustion engines and in particular to a control for such turbochargers which is responsive to engine intake manifold pressure or compressor discharge pressure.

The turbocharger of an internal combustion engine which is operated under full load has what can be called a "self-regulating" feature. The higher the speed of the engine, the higher is the speed of the turbocharger and the pressure at which the air is fed to the engine. The same holds true for operation at constant engine speed under varying loads. Increasing the load increases the engine exhaust gas temperature and exhaust gas flow, thereby increasing the speed of the turbocharger which effects a greater supply of air to burn the greater amount of fuel. This feature makes the turbocharger-engine combination very well acceptable for most applications.

In the recent past, there has developed a demand for higher torque at lower engine speeds in certain applications. This requirement can be met by making the turbocharger deliver air at higher pressure and thus supplying more air for the combustion of a greater amount of fuel. However, in this case with the self-regulating feature of the turbocharger mentioned above, the air pressure level would be raised over the entire engine speed range, including a point where this is neither necessary nor desirable, i.e., at maximum engine speed. Since the pressure developed by a centrifugal type of turbocharger varies as the square of the speed, an increase in delivery pressure sufficient to provide the required increased torque at low engine speed will greatly increase the delivery pressure at higher engine speed.

From the typical diesel cycle (P-V) diagram, it can be understood that a small increase in pressure level at the start of compression can result in a much larger increase in pressure level at the end of compression. Thus, at a high charge air pressure level, the maximum cylinder pressure will be relatively higher at high engine speed than at lower engine speeds (where the charge air pressure is lower) even though the mean effective pressure which represents the theoretical work output per cycle may not be increased. The maximum cylinder pressure is, among others, a limiting factor to the engine output and is particularly adverse to engine life at high engine speeds. Engine manufacturers, therefore, desire to keep the maximum cylinder pressure as low as possible but still want to obtain high engine torque at low engine speeds. These two contradictory requirements cannot be met by a free-running turbocharger; the turbocharger must be equipped with some sort of control device. Such devices have been in experimental use, but they are handicapped by certain drawbacks such as: (1) Parts of the control system are exposed to the hot exhaust gases and, therefore, not satisfactory in operation and service life; and (2) impaired capability of the turbocharger to compensate for decrease in air density at high altitude because the control limits the turbocharger speed. This results from the fact that these prior art controls merely by-pass or dump exhaust gases to atmosphere upstream of the turbocharger, thus placing a positive limitation on the turbocharger speed.

The control arrangement of the present invention utilizes a spring loaded valve which opens at a predetermined compressor discharge pressure of the turbocharger and bleeds air from the turbocharger compressor to hold the output pressure at a predetermined value. The valve may be set, for example, so that it opens when the engine reaches approximately 80% of its rated speed under full load. As the engine speed increases further, the turbocharger compressor outlet pressure (engine intake manifold pressure) does not increase. From altitude tests, it is known that in the case of a free-running turbocharger, the pressure differential between the turbocharger compressor outlet and atmosphere remains substantially constant at all altitudes and thus, the compressor pressure ratio (ratio of compressor inlet to compressor outlet pressure) increases as the density of the air decreases with altitude. The control valve of the present invention senses the compressor outlet pressure, and does not attempt to maintain a constant compressor pressure ratio. Thus, the control does not limit the turbocharger's speed and does not affect its capability to compensate for decreased air density by speeding up at high altitude unless the turbocharger speed-up would raise the compressor outlet pressure above the predetermined value or control point. Aside from aircraft applications, the feature referred to above has utility for cross-country truck engines and for engines powering, for example, mining equipment operated at high altitude.

By utilizing the control arrangement of the present invention, it is further possible to modify the torque curve of the turbocharged engine. The maximum torque that a turbocharged engine can develop at low engine speeds is to a great extent dependent upon the overall efficiency of the turbocharger in the low engine speed range. For a given turbocharger wheel or rotor design, this efficiency cannot be appreciably changed. However, it is possible to increase the low speed torque by supplying more air to the engine. This can be accomplished by utilizing a smaller nozzle area in the turbocharger turbine to cause the turbocharger rotor to rotate faster. Decreasing the nozzle area to increase the turbocharger rotor speed in itself has the disadvantage of also increasing the charge air pressure at higher engine speeds where higher torque and therefore higher charge air pressure is not desired. Using the control valve arrangement of the present invention, the valve may be set so that at higher engine speeds, the compressor outlet pressure is sufficient to give the torque of an engine charged by a free-running turbocharger, while at lower engine speed, the engine torque can be significantly increased.

In one embodiment of the present invention, instead of discharging the air released by the control valve to atmosphere, it is fed to the turbocharger turbine, thereby partially utilizing the energy of this compressed air. This arrangement has the further advantage that feeding this air to the turbine wheel will reduce the temperature of the gas entering the turbine wheel, thereby tending to lengthen the service life of the wheel.

The primary object of the present invention is therefore to provide a turbocharger control for use with turbocharged internal combustion engines which provides for increased engine torque at low engine speeds but which does not adversely affect the turbocharger's ability to increase its speed, thereby compensating for changes in air density with altitude at which the turbocharged engine is operated.

A further object of the present invention is to provide a turbocharger control of the type referred to which limits the engine charging air pressure to a predetermined value.

A further object is to limit maximum engine cylinder pressure and increase engine life.

A further object of the present invention is to provide a turbocharger control of the type referred to which by-passes air from the turbocharger compressor to the turbine wheel whereby the operating temperature of the turbine wheel is lowered.

A further object is to by-pass air around the engine cylinder from the intake manifold to the exhaust manifold or exhaust stack, or the atmosphere to accomplish a modification of the turbocharged engine cycle and change its operating characteristics.

The full nature of the invention will be understood from the accompanying drawings and the following description and claim.

FIG. 1 is a cross sectional view of a turbocharger assembly incorporating the control arrangement of the present invention.

FIG. 2 is a top plan view of the control valve for the turbocharger.

FIG. 3 is a schematic view illustrating the interconnection of the turbocharger and an internal combustion engine in accord with the present invention.

FIG. 4 is a schematic view similar to FIG. 3 but illustrating a modified form of the present invention.

FIG. 5 is a schematic view similar to FIG. 3 but illustrating one type of conventional prior art arrangement.

FIG. 6 is a view similar to FIG. 1 but illustrating the control valve of the present invention arranged for internal, as distinguished from external, adjustment.

FIG. 7 is a schematic view similar to FIG. 3 but illustrating a further modified form of the present invention.

FIG. 8 is a view similar to FIG. 6 but showing a further modified form of the present invention.

Referring initially to FIGS. 1 and 2, the turbocharger includes a turbine housing 10 which includes an intake passage 11. The intake passage includes a nozzle area 12 which may have gas directing vanes 13 disposed therein. Mounted upon a central shaft 14 is a turbine wheel or rotor 16 carrying a plurality of vanes 17. The open end 18 of the turbine housing permits the exit of spent gases from the turbocharger and may be connected to an exhaust stack communicating with atmosphere. The turbine, itself, is of conventional construction and, it will be understood, high pressure gases entering the turbine at the intake passage 11 are expanded through the turbine wheel, causing rotation thereof, the spent gases being discharged through the turbine outlet passage 18.

Attached to the turbine housing casting is an intermediate casting 21, the two castings being held by means of a clamp ring 23. Between the two castings, there are interposed annular members 24 and 26 which define the nozzle ring and nozzle back plate for the turbine. The casting 21 is provided with an elongated cylindrical portion 27 through which the shaft 14 extends. The cylindrical portion carries rotary and thrust bearings indicated generally at 28 which permit free rotation of the shaft. A radial passage 29 in the casting 21 permits access to the shaft and bearings of lubricating fluid.

Bolted to the casting 21 is a compressor back plate casting 41, the joint being sealed by a sealing ring 32. Also attached to the casting 21 by means of the clamp ring 33 is the compressor cover casting 31 with gasket 34 interposed between the castings. The shaft 14 and the cylindrical portion 27 carry cooperating components of a conventional thrust bearing indicated generally at 36. The extending portion of the shaft 14 is of reduced diameter and has mounted thereon a centrifugal-type compressor rotor or wheel 38 carrying a plurality of compressor blades 39. The casting 41 together with the casting 31, provides an annular collector area 42 which accommodates high pressure gases delivered from the compressor. It will be understood that the collector area 42 communicates with a conventional tangentially extending outlet or discharge opening (not shown), the opening being connected by appropriate tubing to the intake manifold of the internal combustion engine served by the turbocharger.

The casting 31 is flanged to provide an inlet passage 43 which communicates with the atmosphere or air induction system of the engine. It will be understood that with the engine upon which the turbocharger is installed in operation, the exhaust gases will rotate the turbine wheel 16 to drive the compressor impeller or wheel 38. Rotation of the compressor wheel will charge the engine with compressed air, thereby forcing into the engine cylinders an amount of charge air greater than could be drawn into it by the pumping action of the engine pistons. This charging action combined with increased fuel supply to the engine cylinders produces the increased power which is characteristic of supercharged engines.

There has so far been described a turbocharger and its operation without reference to the control arrangement of the present invention which, as previously stated, can be used to limit the pressure of the air delivered by the turbocharger to the engine cylinders. In a turbocharger incorporating the control valve of the present invention, the housing castings are formed to provide a passage 44 which extends from the collector area 42 to the intake passage of the turbine. The final portion of the passage 44 is indicated at 44f in FIG. 1, this portion of the passage terminating at the area between the vanes 13 and the turbine blades 17. While the terminating portion 44f of the passage 44 is shown as communicating with the area just adjacent the blades 17, it will be understood that it might also communicate with the area upstream of the nozzle ring, that is, upstream of the vanes 13 rather than as shown in FIG. 1.

The casting 21 is provided with a threaded aperture 46 which accommodates a valve assembly indicated generally at 47. The valve assembly includes a hex-head portion 45 from which extend opposed frame members 50. The upper ends of the frame members are integral with an annular portion 48 formed to provide an annular, inclined valve seat 49. Cooperating with the valve seat is a circular closure member 51 having a stem 52 extending coaxially therefrom. Portions 53 extend radially inward from the frame members 50 and carry a hub 54 (FIG. 2) within which the stem 52 is free to move. At its lower end, the stem 52 carries a spring retainer 56. A compression spring 57 extends between the retainer 56 and the under faces of the inwardly extending portions 53. It may thus be seen that the spring 57 serves to resiliently urge the closure 51 against the seat 49 and that the under face of the closure 51 is exposed to the pressure of gases in the collector area and in the upstream portion of the passage 44. It will be understood that the valve assembly 47 may be removed from the turbocharger housing to permit adjustment of the force exerted by spring 57 or the replacement of the spring.

The operation of the control arrangement may now be described with reference to FIGS. 1 and 3. In FIG. 3 reference numeral 61 denotes the cylinder head of an internal combustion engine having a piston 62, an intake valve 63 and an exhaust valve 64. The compressor portion of the turbocharger is indicated at 66 and the outlet fitting from the compressor is shown connected to the intake manifold of the engine by means of tubing 67. In the schematic illustration of FIG. 3, the passage 44 is illustrated as a tubing connecting the high pressure side of the control to the turbine inlet, the passage 44 and valve closure 51 carrying the same reference numerals in FIG. 3 as in FIG. 1. The turbine portion of the turbocharger is indicated at 68 and is provided with an outlet passage for spent gases as indicated at 69. Tubing 71 connects the exhaust manifold of the engine to the inlet passage or duct 11 (FIG. 1) in the turbine. The mechanical connection between the turbine and the compressor, formed by the shaft 14, is not shown in FIG. 3.

With the engine in operation, the turbine will drive the compressor to charge the engine cylinder with high pressure air. At low engine speeds, the turbocharger will thus function to supply sufficient air for high engine torque. At high engine speeds, when the compressor outlet pressure reaches a value determined by the spring 57, the valve closure 51 will be lifted off its seat 49, allowing gases to move from the collector area 42 of the compressor into the turbine inlet passage. The energy of this by-passed air is thus partially utilized by feeding it into the turbine. Feeding these gases into the turbine lowers the overall temperature of the gases entering the turbine wheel since they are at considerably lower temperature than the temperature of the engine exhaust gases. The lowered temperature of the gases acts to cool the turbine wheel prolonging the life of the wheel. It should be noted that the arrangement does not directly limit the speed of the turbine and thus does not destroy the turbocharger's ability to compensate for changes in ambient air density with altitude. Since the control valve responds only to compressor outlet pressure, that is, engine intake manifold pressure, the turbine is allowed to increase in speed with increasing altitude until such time as the turbine speed increase would be sufficient to raise the engine intake pressure to the predetermined maximum value determined by spring 57.

The action of this arrangement may be compared to the conventional waste gate control arrangement shown in FIG. 5. In FIG. 5, components corresponding to those of FIG. 3 are given identical reference numerals, but with the suffix "a." In this conventional arrangement, a waste gate or valve 72 controls the dumping of gases to atmosphere before they enter the turbine. In this arrangement it will be evident that the waste gate functions to determine a maximum speed for the turbine, thereby destroying its ability to compensate for the decrease in air density at higher altitudes. Further, the waste gate control valve is exposed to the hot engine exhaust gases and thus may have a relatively unsatisfactory service life.

FIG. 4 illustrates a slightly modified form of the control arrangement wherein the control valve discharges gases from the compressor collector area into the atmosphere rather than returing them to the turbine as shown in FIG. 3. Parts having counterparts in FIG. 3 are given the same reference numerals as in FIG. 3, but with the suffix "b." In this arrangement, gases passing through the control valve 51b, which is opened whenever the compressor outlet pressure reaches a predetermined value, are discharged directly to atmosphere. This arrangement permits the turbine to speed up to compensate for decreases in air density with increasing altitude, but does not have the added feature of lowering the temperature of the gases acting on the turbine wheel. For this arrangement, the setting of the spring acting on the control valve, that is the force exerted by the spring tending to close the control valve, must be more than the corresponding setting for the arrangement of FIG. 3 to provide the same predetermined compressor outlet pressure since, in the case of the FIG. 4 arrangement, the bleed-air is released against atmospheric pressure rather than against a higher pressure prevailing in the turbine.

FIG. 7 illustrates a further modified form of the control arrangement wherein the control valve discharges gases from the compressor collector area to an exhaust stack 91. Components in FIG. 7 which have counterparts in FIG. 3 are given the same reference numerals as in FIG. 3 but with the suffix "c." In this arrangement, gases passing through the control valve 51c, which is opened whenever the compressor outlet pressure reaches a predetermined value, are discharged through a tube 44c into the exhaust stack 91. The portion of the tube 44c within the stack 91 is formed so that gases issuing therefrom are directed outwardly with the exhaust gases from the turbine. This form of the invention has the features referred to above with reference to FIG. 4 but additionally serves to lower somewhat the turbine exhaust pressure because of the aspirating effect of the by-passed gases introduced into the turbine exhaust gas stream. Because the compressor and the ejector formed by the end of tube 44c cannot operate at 100% efficiency, the slight reduction in turbine exhaust pressure due to the aspirating effect is insufficient to increase the speed of the turbine to destructive or undesirable magnitudes.

FIG. 6 illustraes a modified form of the control valve incorporated in a turbocharger of a somewhat different design. In FIG. 6, components having their counterparts in FIG. 1, are given the same reference numeral as in FIG. 1 but with the suffix "d." In this arrangement, the valve assembly includes a sleeve 81 having an inclined seat area 82. A valve disc or closure 83 cooperates with the seat and carries a stem 84. A compression spring 86 encircles the stem and is held by a retainer 87 mounted on the end of the stem. A stationary hub 88 serves to guide the stem 84 and provides a stationary surface for bottoming the spring 86. The operation of the arrangement of FIG. 6 is identical to that of the arrangement of FIG. 1. The principal difference in the two constructions is that in the FIG. 6 arrangement, the turbocharger must be disassembled to replace or adjust the control valve.

FIG. 8 illustrates a modified form of the arrangement described with reference to FIG. 6. It differs from the structure of FIG. 6 in that the gases passed by the control valve are discharged, not to the turbine wheel, but to the turbine exhaust or discharge passage. Thus, in the structure of FIG. 8, there is no passage 44d providing communication between the outlet side of the control valve and the turbine wheel but, instead, the outlet side of the control valve communicates, by means of tubing 93, with the turbine discharge passage. In FIG. 8, components having counterparts in FIG. 6 are given the same reference numerals as their counterparts but with the suffixe "e."

From the foregoing, it will be evident that there is provided a turbocharger control arrangement which limts the cylinder pressure of the engine served by the turbocharger rather than limiting the turbine speed as in conventional waste gated arrangements. Within the range in which the engine intake pressure is not raised above the predetermined value, the turbine speed will increase as the turbocharged engine is operated at higher altitudes and the turbocharger may thus compensate for altitude as in the case of a free-running uncontrolled turbocharger. In the arrangement of FIG. 3, the by-passed gases are utilized to lower the operating temperature of the turbine wheel. It will also be understood that these by-passed gases might be introduced into the turbine at an angle such as to aid or retard rotation of the turbine.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

In a turbocharger for an internal combustion engine, said turbocharger including a housing mounting a centrifugal-type compressor and a turbine for driving said compressor, said compressor including a high-pressure collector chamber and said turbine including an intake gas passage upstream from the turbine wheel, said housing being formed to provide a gas passage between said collector area and said turbine intake passage, a control valve assembly removably inserted into said housing and extending into said gas passage, said assembly including an annular valve seat bounding an intermediate portion of said gas passage, a valve closure for said seat and having a stem extending coaxially therefrom, a compression spring acting on said stem for biasing said closure against said seat, one face of said closure being exposed to the pressure in said compressor collector chamber, whereby when the pressure in said collector chamber reaches a predetermined value, said closure will be moved from said seat against the force exerted by said compression spring to permit gases to flow from said collector chamber into said turbine intake passage.

References Cited in the file of this patent

UNITED STATES PATENTS

| | | |
|---|---|---|
| 1,984,013 | Fast | Dec. 11, 1934 |
| 2,172,809 | Schmitt | Sept. 12, 1939 |
| 2,173,595 | Schutte | Sept. 19, 1939 |
| 2,379,455 | Prince | July 3, 1945 |
| 2,559,623 | Holmes | July 10, 1951 |

FOREIGN PATENTS

| | | |
|---|---|---|
| 504,263 | Great Britain | Apr. 21, 1939 |
| 807,071 | Great Britain | Jan. 7, 1959 |